US011423796B2

United States Patent
(12) United States Patent
Jayashankar

(10) Patent No.: US 11,423,796 B2
(45) Date of Patent: Aug. 23, 2022

(54) INTERACTIVE FEEDBACK BASED EVALUATION USING MULTIPLE WORD CLOUD

(71) Applicant: Shailaja Jayashankar, Bangalore (IN)

(72) Inventor: Shailaja Jayashankar, Bangalore (IN)

( * ) Notice: Subject to any disclaimer, the term of this patent is extended or adjusted under 35 U.S.C. 154(b) by 0 days.

(21) Appl. No.: 16/496,449

(22) PCT Filed: Apr. 2, 2019

(86) PCT No.: PCT/IN2019/050272
§ 371 (c)(1),
(2) Date: Sep. 22, 2019

(87) PCT Pub. No.: WO2019/193602
PCT Pub. Date: Oct. 10, 2019

(65) Prior Publication Data
US 2021/0343173 A1 Nov. 4, 2021

(51) Int. Cl.
*G09B 7/02* (2006.01)
*G06F 16/21* (2019.01)
*G06F 40/284* (2020.01)
*G06F 40/247* (2020.01)

(52) U.S. Cl.
CPC .............. *G09B 7/02* (2013.01); *G06F 16/211* (2019.01); *G06F 40/247* (2020.01); *G06F 40/284* (2020.01)

(58) Field of Classification Search
None
See application file for complete search history.

(56) References Cited

U.S. PATENT DOCUMENTS

2002/0156763 A1* 10/2002 Marchisio ............... G06F 16/30
2003/0217047 A1* 11/2003 Marchisio ............. G06F 16/334
2008/0126319 A1* 5/2008 Bukai ................... G06F 16/951
2009/0202973 A1* 8/2009 Fitzgerald ................ G09B 7/02 434/362
2010/0291528 A1* 11/2010 Huerta ..................... G09B 7/00 434/362
2012/0214147 A1* 8/2012 Ernst ........................ G09B 7/00 434/353
2014/0234824 A1* 8/2014 Schepman ............... G09B 7/02 434/350
(Continued)

*Primary Examiner* — Nathan Hillery

(57) ABSTRACT

A system for assessing a response from a user for at least one learning content and providing interactive feedback based on an assessment of user content is provided. The system comprises a memory that stores a set of instructions and a processor that executes the set of instructions. The processor is configured to: (a) generate a database with at least one learning content, wherein the database further stores at least one question associated with the at least one learning content or answer key for the at least one question; (b) provide the at least one learning content and a test comprising the at least one question to a user on a user device; (c) process a response from the user with reference to the at least one question associated with the at least one learning content module using a graphical user interface for communicating interactively with the database; (d) automatically assess the response from the user; and (e) provide interactive feedback to the user as score or a graphical representation.

15 Claims, 20 Drawing Sheets

(56) References Cited

U.S. PATENT DOCUMENTS

2014/0297266 A1* 10/2014 Nielson .................. A61B 5/162
704/9
2014/0342320 A1* 11/2014 Nielson .................. A61B 5/411
434/156
2015/0012288 A1* 1/2015 Riley ..................... G16H 10/20
705/2
2015/0037765 A1* 2/2015 Jaggi ........................ G09B 7/02
434/169
2015/0348433 A1* 12/2015 Gatterbauer ......... G06Q 10/101
434/353
2016/0063873 A1* 3/2016 Zimmer ................. G06Q 50/20
434/353
2017/0084197 A1* 3/2017 Crouse ..................... G09B 7/00
2018/0240352 A1* 8/2018 Thomas ................... G09B 7/02
2018/0374377 A1* 12/2018 Watkins, Jr. ............. G09B 7/00
2019/0066525 A1* 2/2019 Palau ....................... G09B 5/00
2019/0156826 A1* 5/2019 Cromack ................ G06F 40/30

* cited by examiner 602 604 606 608 610

| Subject | No of students | No of question | Average Human evaluation | Average Human evaluation using cohesion cloud |
|---|---|---|---|---|
| Computer Science | 10 | 40 | 95 | 96 |
| Physics | 8 | 4 | 96 | 95 |
| Biology | 8 | 5 | 96 | 94 |
| Business Studies | 5 | 5 | 95 | 93 |
| Economics | 4 | 5 | 92 | 93 |
| English | 13 | 4 | 90 | 90 |
| Geography | 6 | 3 | 93 | 94 |
| History | 7 | 3 | 94 | 93 |
| | | Average | 93.875 | 93.5 |

| SUBJECT | NO | QUESTION | Marks |
|---|---|---|---|
| Computer Science | 1 | Give one benefit of writing code in a high-level language? | 1 |
| | 2 | Describe two benefits of using USB connections between a computer and a device? | 2 |
| English | 1 | Using your own words, give two effects that the singing of the national anthem had on the writer? | 2 |
| | 2 | How did the piano player slightly spoil the musical effect of the national anthem? | 2 |
| Biology | 1 | Suggest why the chimpanzee population has decreased? | 1 |
| | 2 | State two methods, other than captive breeding of conserving endangered species? | 2 |
| Economics | 1 | Describe what is meant by a country's inflation rate? | 2 |
| | 2 | Explain the factors that influence a country's birth rate? | 3 |
| History | 1 | How significant was the failure of the Schlieffen Plan to the course of the First World War? | 4 |
| | 2 | How important were events at sea to the outcome of the First World War? | 5 |

| Type | Answer | Marks gained | Cohesive Word cloud |
|---|---|---|---|
| Answer key | Legitimate-looking emails sent to a user as soon as recipient opens clicks on link in the email attachment<br><br>… the user is directed to a fake website (without their knowledge). To obtain personal financial information data. | 2 | 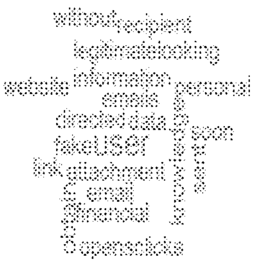 |
| 1st candidate's answer | Phishing is where the creator sends out a legitimate-looking email in the hope of gathering personal and financial information from the recipient. As soon as the recipient clicks on the link in the email they are sent to a bogus website where they will be asked for personal information. | 2 |  |
| 2nd candidate's answer | Emails sent to users from a criminal who is acting as an important organization. The criminal will ask for important and secure data from the customers by posing as the organization. | 1 | 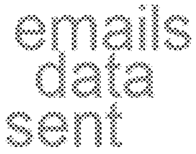 |

| Question | Answer Key | Student answer |
|---|---|---|
| What does the writer say about the way the children sang the national anthem? | The children were standing to attention, hands placed over their hearts; they sang it solemnly with patriotic pride. | They sang in utmost patriotic zeal and attention with hands on their heart. |

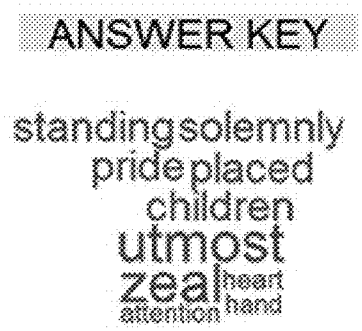

STUDENT ANSWER

COMPARATIVE WORD CLOUD

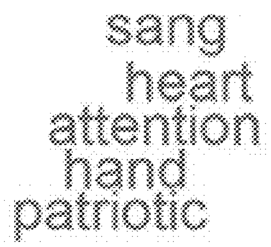

COHESIVE WORD CLOUD

| Question | Answer Key | Student answer |
|---|---|---|
| Suggest why the chimpanzee population has decreased ? | Habitat loss, deforestation, competition from human, hunting pollution and diseases. | Growth in population has led to cutting down of trees to convert forests into cities leading to deforestation. Increase in pollution cause diseases in animals too. |

COMPARATIVE WORD CLOUD

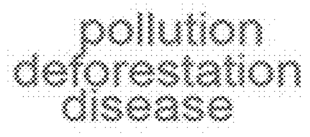

COHESIVE WORD CLOUD

| Question | Answer Key | Student answer |
|---|---|---|
| Explain the factors that influence a country's birth rate. | Factors include:<br><br>Average age of the population<br><br>Proportion of women who work<br><br>Age at which women marry<br><br>Social status of women<br><br>Cost of bringing up children<br><br>Availability of family planning service | Birth rate = Number of live births / Total population * 1000<br><br>The factors affecting the country's birth rates depend on whether a country is developed or developing.<br><br>Availability of family planning services – When there is widespread ignorance and illiteracy, it becomes more difficult to make available family planning services, higher the availability, lower is the birth rate of a country.<br><br>Female employment – It is usually seen that higher is the female employment and literacy rates, lower is the birth rate.<br><br>Availability of neo natal care and infant mortality rates – When there is ease of availability of medical care for mother and child then there is higher birth rates.<br><br>Social and religious beliefs – When the popular religion in the country does not advocate child planning then the birth rates would be higher.<br><br>In the above case, China was experiencing shortage of workers because of lower birth rates and also an ageing population which is because of the one child policy. |

| Question | Answer Key | Student answer |
|---|---|---|
| Describe the relief, settlement and land-use of the area shown in the photograph. | Valley, Flat floor, Steep sides, village, sloping roof, fields, cultivation, forest, channel, road | Relief valley, flat floor, steep sides settlement at foot of slope village and gently sloping roofs, land-use fields cultivation forest irrigation channel |

STUDENT ANSWER

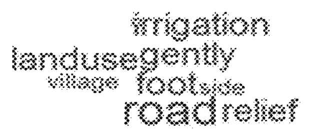

ANSWER KEY

COMPARATIVE WORD CLOUD

COHESIVE WORD CLOUD

| Sl. No. | Question type | IM Average answer length (words) | SM Average answer length (words) | IM Average human-system agreement rate (Z1) | SM Average human-system agreement rate (Z2) | IM Average time taken in minutes (a1) | SM Average time taken in minutes (a2) |
|---|---|---|---|---|---|---|---|
| 1 | Sentence completion | 1.4 | 1.3 | 99.52% | 100% | 2.0 | 1.0 |
| 2 | Single term generation | 2.2 | 1.2 | 100% | 100% | 2.20 | 1.10 |
| 3 | "Quantity" required | 2.9 | 2.5 | 100% | 100% | 2.20 | 1.20 |
| 4 | "Numerical value" generation | 2.3 | 2.1 | 99.04% | 100% | 3.0 | 1.10 |
| 5 | "Location" or "source" required | 3.4 | 2.5 | 97.61% | 100% | 4.40 | 1.30 |
| 6 | "Example" required | 2.8 | 2.4 | 97.14% | 100% | 4.20 | 1.20 |
| 7 | List | 7.3 | 7.2 | 93.80% | 97.03% | 7.50 | 1.60 |
| 8 | "Ordering / rearrangement" required | 10.5 | 10.4 | 93.33% | 94.23% | 7.50 | 2.10 |
| 9 | Short explanation / description | 8.7 | 9.1 | 91.90% | 95.83% | 11.00 | 2.0 |
| 10 | "Reason" or "justification" required | 10.1 | 11.2 | 90.47% | 93.54% | 12.40 | 2.30 |
| 11 | "Way of doing something" required | 9.6 | 10.3 | 90.95% | 94.78% | 10.50 | 2.10 |
| 12 | Definition | 13.6 | 13.8 | 88.57% | 95.03% | 12.40 | 2.50 |
| 13 | Compare | 10.7 | 11.5 | 95.23% | 96.47% | 8.00 | 2.50 |
| 14 | Contrast | 19.6 | 18.5 | 88.09% | 92.98% | 16.40 | 3.40 |
| 15 | Composite | 15.9 | 16.1 | 85.71% | 93.67% | 14.00 | 3.20 |

| Model | Accuracy | Time |
|---|---|---|
| IndusMarker | 4.720417 | 4.753625 |
| Superlative Model | 2.818505 | 0.775948 |

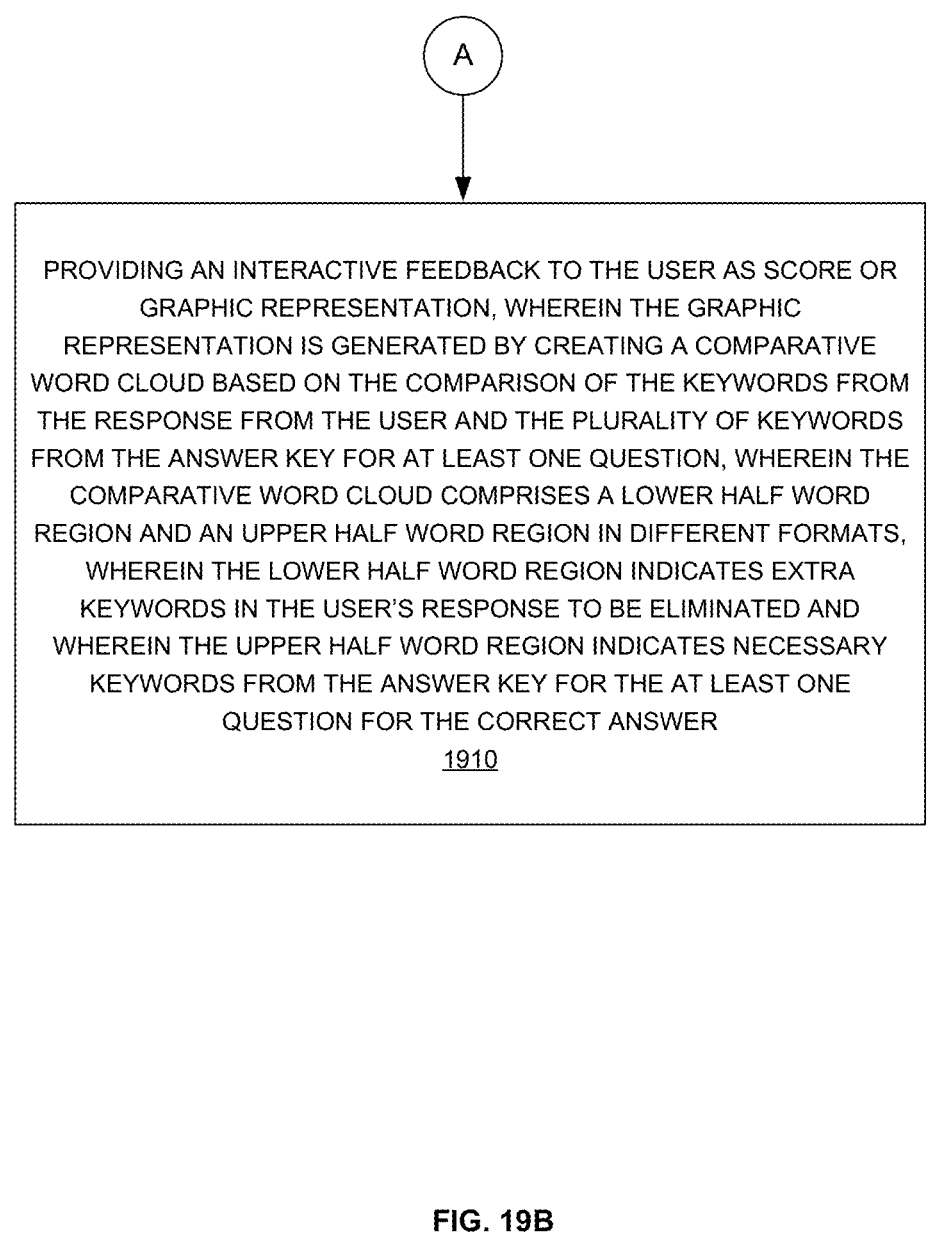

PROVIDING AN INTERACTIVE FEEDBACK TO THE USER AS SCORE OR GRAPHIC REPRESENTATION, WHEREIN THE GRAPHIC REPRESENTATION IS GENERATED BY CREATING A COMPARATIVE WORD CLOUD BASED ON THE COMPARISON OF THE KEYWORDS FROM THE RESPONSE FROM THE USER AND THE PLURALITY OF KEYWORDS FROM THE ANSWER KEY FOR AT LEAST ONE QUESTION, WHEREIN THE COMPARATIVE WORD CLOUD COMPRISES A LOWER HALF WORD REGION AND AN UPPER HALF WORD REGION IN DIFFERENT FORMATS, WHEREIN THE LOWER HALF WORD REGION INDICATES EXTRA KEYWORDS IN THE USER'S RESPONSE TO BE ELIMINATED AND WHEREIN THE UPPER HALF WORD REGION INDICATES NECESSARY KEYWORDS FROM THE ANSWER KEY FOR THE AT LEAST ONE QUESTION FOR THE CORRECT ANSWER
1910

FIG. 19B

INTERACTIVE FEEDBACK BASED EVALUATION USING MULTIPLE WORD CLOUD

BACKGROUND

Technical Field

Embodiments of this disclosure generally relate to evaluation of natural Language based answers, more particularly, to a system and a method for providing an interactive feedback based evaluation/assessment of content using multiple word cloud.

Description of the Related Art

Traditional assessment systems in educational institutions consist of paper of question and answers which are manually scored by instructors. With the advent of laptop computers and tablets, software based Learning Management Systems (LMSs) have been introduced. LMSs provide for the administration, documentation, tracking, reporting, and delivery of e-learning education courses, training programs and e-assessments. Colleges and universities use LMSs to deliver online courses and augment on-campus courses and ease evaluation of student skills. Corporate training departments use LMSs to deliver online training, as well as to automate record-keeping and employee registration. K12 institutions also use LMSs for course management, assignment management, discussions, and grading.

Technology has tried to reduce the burden on instructors by introducing more e-assessment systems in place of manual assessment such as in patent application number: US 20130017530 A1, which discloses a learning system enabling a performance assessment to be incorporated or integrated into instructional materials being administered to a student as part of the student's current learning prescription. As the student progresses through the instructional materials, the system collects and maintains data regarding the student's performance. When data indicate that the student is not meeting certain educational goals, the system adjusts or alters the student's learning prescription to accommodate the student's current needs. Most of such systems are applicable for MCQ (Multiple choice questions) and hence is challenged while evaluating more descriptive answers.

U.S. patent application Ser. No. 13/509,743 titled "Assessment of effective learning and top performance in competitive exam-system, method, user interface and a computer application details on user input to questions with an input selection and a reason for choice of that input selection. The application aims to integrate effective feedback to the user and improve performance in such competitive exams. However, the application can be applicable to MCQ's and cannot be extrapolated to short or descriptive answers with a qualitative approach.

Active-learning methodologies have been shown to improve student conceptual understanding. Active learning includes activities which are designed in engaging students in classroom exercises blended with learning outcomes, promote student reflection, and get them to think about what they are learning. Formative assessment is one integral aspect of these methodologies that help meet these design criteria. Assessments that include students' short written explanations or reflections can enhance learning. However, it is difficult to deeply examine written responses in large classes for instructors and providing feedback is often neglected in such scenarios.

Modern assessment technologies evolved to use automatic assessment systems for evaluating both short and descriptive answers. Natural Language Processing (NLP), Latent Sematic Analysis, Artificial Intelligence (AI), Machine Learning (ML) and several other techniques have been used to automate assessment. In particular, Artificial Intelligence technology aids in the assessment of MCQ's which are evaluated with 100% accuracy. In one of the existing e-assessment system, a user gets questions which when answered correctly is posed with harder questions. If the user does not answer the correct questions, he is posed with a similar question to attain mastery of concepts. In such a system, a feedback and detailed statistical assessment of student's performance is shown. However, the challenge still exists when the evaluation of short or more descriptive content is presented by users to instructors. The statistical analysis cannot be provided in such cases.

Word clouds, term clouds or Tag clouds, is a promising technology that has shown to overcome the challenge of evaluating short and descriptive answers to summarize text data and provide graphical interpretation. While word clouds are generally interpreted in terms of the most common words, attention to missing words or infrequent words or negative statements can be just as important. The context from which a word cloud is created also plays an important role in the interpretation of the resultant word clouds. Existing automatic assessment tool typically has an accuracy of about 80 to 85%, none of the automatic assessment tool has achieved an accuracy of about 95 to 100%.

Granted U.S. Pat. No. 8,818,788B1, describes to the collection and distribution of content, wherein various ways of identifying words within a collection of text that applies to a specific sentiment and systems and computer program products implementing same as a word cloud. However, the word cloud is a quantitative representation, wherein the number of times a sentiment (word) appears, the size of the word cloud is represented. This application, however, does not overcome the problem, of a qualitative word cloud as per the present invention.

Thus, there remains a need for a system to overcome the disadvantages of the existing technology via an Interactive Feedback based evaluation using multiple word cloud.

SUMMARY

In view of the foregoing, an embodiment herein provides a system for assessing a response from a user for at least one learning content and providing a score based on an assessment of user content. The system comprises a memory that stores a set of instructions and a processor that executes the set of instructions. The processor is configured to (a) generate a database with at least one learning content, wherein the database further stores at least one question associated with the at least one learning content or answer key for the at least one question; (b) provide the at least one learning content and a test comprising the at least one question to a user on a user device; (c) process a response from the user with reference to the at least one question associated with the at least one learning content module using a graphical user interface for communicating interactively with the database; and (d) automatically assess the response from the user by (i) eliminating a standard list of English stop words; (ii) tokenizing keywords and corresponding synonyms from the response, (iii) performing correlation analysis for each keyword, (iv) comparing the keywords from the response with a plurality of keywords of the answer key for the at least one question, wherein the answer key for the at least one question is processed using a superlative model to create a cohesive cloud with the plurality of keywords, wherein each of the plurality of keywords of the answer key is assigned with a numeric weight based on its frequency, and (v) computing a score for each keyword from the response based on the comparison. In an embodiment, the processor is configured to provide an interactive feedback to the user as score or a graphical representation, wherein the graphical representation is generated by creating a comparative word cloud based on the comparison of the keywords from the response from the user and the plurality of keywords from the answer key for at least one question, wherein the comparative word cloud comprises a lower half word region and an upper half word region in different formats, wherein the lower half word region indicates extra keywords in the user's response to be eliminated and wherein the upper half word region indicates necessary keywords from the answer key for the at least one question for the correct answer.

In one embodiment, the at least one learning content comprises at least one of a text, a visual or a video arithmetic. In another embodiment, the at least learning content is divided into a plurality of sub-learning content. The plurality of sub-learning content comprises a plurality of elements to be provided in a predefined flow. Each of the plurality of elements comprises at least one item of content.

In yet another embodiment, the automatic assessment comprises a quantitative and qualitative assessment of the response from the user. The size of the comparative word cloud is based on the relevance of each keyword. In yet another embodiment, the graphical representation of assessment comprises a comparability and commonality word cloud and/or a Venn diagram for the user.

In yet another embodiment, the processor provides the interactive feedback to the user using the graphical user interface of the user device. In yet another embodiment, the processor positions the keywords from the response that has high frequencies at a center of the comparative word cloud.

In one aspect, a computer-implemented method for assessing a response from a user for at least one learning content and providing interactive feedback based on an assessment of user content is provided. The method comprises the steps of (a) generating a database, with at least one learning content, wherein the at least one or more learning content is divided into a plurality of sub-learning content comprising a plurality of elements to be provided in a predefined flow, wherein each element of the plurality of elements includes at least one item of content, wherein the database further stores at least one question associated with the at least one learning content or answer key for the at least one question; (b) providing, the at least one learning content and a test comprising the at least one question to a user on a user device; (c) processing a response from the user with reference to the at least one question associated with the at least one learning content module using a graphical user interface for communicating interactively with the database; (d) automatically assessing, the response from the user by (i) eliminating a standard list of English stop word, (ii) tokenizing keywords and corresponding synonyms from the response, (iii) performing correlation analysis for each keyword, (iv) comparing the keywords from the response with a plurality of keywords of the answer key for the at least one question, wherein the answer key for the at least one question is processed using a superlative model to create a cohesive cloud with the plurality of keywords, wherein each of the plurality of keywords of the answer key is assigned with a numeric weight based on its frequency, and (v) computing a score for each keyword from the response based on the comparison; and (e) providing an interactive feedback to the user as score or graphical representation, wherein the graphical representation is generated by creating a comparative word cloud based on the comparison of the keywords from the response from the user and the plurality of keywords from the answer key for at least one question, wherein the comparative word cloud comprises a lower half word region and an upper half word region in different formats, wherein the lower half word region indicates extra keywords in the user's response to be eliminated and wherein the upper half word region indicates necessary keywords from the answer key for the at least one question for the correct answer.

In one embodiment, the automatic assessment comprises a quantitative and qualitative assessment of the response from the user. The size of the comparative word cloud is based on the relevance of each keyword. In another embodiment, the graphical representation of assessment comprises a comparability and commonality word cloud and/or a Venn diagram for the user.

In yet another embodiment, the interactive feedback is provided to the user using the graphical user interface of the user device.

In yet another embodiment, the keywords from the response that has high frequencies are positioned at a center of the comparative word cloud. In yet another embodiment, the at least learning content is divided into a plurality of sub-learning content comprising a plurality of elements to be provided in a predefined flow. Each of the plurality of elements comprises at least one item of content.

In yet another embodiment, a non-transitory computer-readable storage medium storing a sequence of instructions, which when executed by a processor, causes to perform a method of assessing a response from a user for at least one learning content and providing interactive feedback based on an assessment of user content is provided. The method includes the steps of: (a) generating a database with at least one learning content, wherein the at least learning content is divided into a plurality of sub-learning content comprising a plurality of elements to be provided in a predefined flow, wherein each of the plurality of elements comprises at least one item of content, wherein the database further stores at least one question associated with the at least one learning content or answer key for the at least one question; (b) providing the at least one learning content and a test comprising the at least one question to a user on a user device; (c) processing a response from the user with reference to the at least one question associated with the at least one learning content module using a graphical user interface for communicating interactively with the database; (d) automatically assessing the response from the user by (i) eliminating a standard list of English stop words, (ii) tokenizing keywords and corresponding synonyms from the response, (iii) performing correlation analysis for each keyword, (iv) comparing the keywords from the response with a plurality of keywords of the answer key for the at least one question, wherein the answer key for the at least one question is processed using a superlative model to create a cohesive cloud with the plurality of keywords, wherein each of the plurality of keywords of the answer key is assigned with a numeric weight based on its frequency, and (v) computing a score for each keyword from the response based on the comparison; and (e) providing an interactive feedback to the user as score or a graphical representation, wherein the graphical representation is generated by creating a comparative word cloud based on the comparison of the keywords from the response from the user and the plurality of keywords from the answer key for at least one question, wherein the comparative word cloud comprises a lower half word region and an upper half word region in different formats, wherein the lower half word region indicates extra keywords in the user's response to be eliminated and wherein the upper half word region indicates necessary keywords from the answer key for the at least one question for the correct answer.

In one embodiment, the automatic assessment comprises a quantitative and qualitative assessment of the response from the user. The size of the comparative word cloud is based on the relevance of each keyword. In another embodiment, the graphical representation of assessment comprises a comparability and commonality word cloud and/or a Venn diagram for the user.

In an embodiment, the interactive feedback is provided to the user using the graphical user interface of the user device.

The embodiment herein provides a system for interactive feedback based assessment of user content, comprising at least one computer-readable storage medium in communication with at least one processor further comprising instructions stored thereon which, when executed by the at least one processor, cause the at least one processor to perform operations comprising storing, providing, receiving, assessment and/or providing feedback of data for at least one learning content.

In one embodiment at least one element as described in the system may be provided to two or more of the plurality of users at the same time.

In one embodiment, the user response associated with the at least one element as described in the system may be received from the two or more users at the same time.

In one embodiment, wherein providing the at least one learning content includes withholding providing an update to the learning content in a current element, a next element, or an update to the learning content in a previous element in the at least one learning content to the at least one user until an expected user response associated with the current element is received from the at least one user.

In one embodiment, wherein the processor determines and assesses the user response with the data content previously stored in the system.

In one embodiment, the content as described in the system comprises text, visual, video arithmetic and/or the like.

In one embodiment, the user device comprises of a laptop computer, a desktop computer, a tablet computer, a mobile phone and/or the like.

In one embodiment, the assessment of the user response from the user with the data stored in the relevant learning content is represented as a score and/or graphical representation.

Embodiment herein also discloses a system for interactive feedback based assessment of user content, wherein the user response is compared with the stored data in the processor to provide feedback based on the user response.

In one embodiment, the assessment method uses multiple word cloud to analyze the user response to the data stored in the processor related to the learning content.

In one embodiment, the assessment of the user response is a graphic representation, wherein the comparative and commonality word clouds are separately generated for the evaluation and a Venn diagram for the feedback.

Embodiment herein discloses a system for interactive feedback based user response, wherein when the user points to any word in the word cloud and/or Venn diagram, the entire user response is displayed.

In one embodiment, the comparative cloud of the Venn diagram, represent the relevant user response and irrelevant user response with respect to the data stored in the processor related to the learning content.

In one embodiment, the system advantageously analyses both short and long descriptive user response such as short and long answers to any questions and changes into a graphical word cloud to effectively provide instant feedback to the user pertaining to the relevancy of the user response.

In one embodiment, the system is used in e-assessment of learning content, wherein the teacher stores data related to teaching material in the plurality of processors, while the user response (user inputs) into the assessment system, wherein the assessment system evaluates the user response (e.g. students input data) with respect to the teacher stored data and provides a visual comparative representation of content personalized for each user/student based on the user response.

In one embodiment, the system, the automatic assessment operates by performing data mining of keywords in stored data and user response, wherein the accuracy of evaluation is achieved via filtering out of stop words such as a, an, the that that only adds structure to the sentences, and/or filtering out plural forms of words and/or filtering out words other than the root words known as stemming of words and/or filtering our parts of speech and/or using synonyms of the words and/or considering negative or contraindicating words and/or considering the distance between words using Cosine similarity.

In one embodiment, the system uses multi-cloud approach to display the comparative cloud between the stored data and the user response, wherein the word cloud is both a qualitative and quantitative word cloud.

In one embodiment, the system uses quantitative and quantitative word cloud, wherein the size of the word cloud is proportional to the number of times a keyword is used in user response, and the relevance of the keywords to the stored data, even if the keyword appears only once.

In one embodiment, the system provides an effective tool for e-assessment in education for both users and teachers. As the system converts boring text into visually appealing graphics with words that are easy to assess and provide feedback.

In one embodiment, the system provides a more effective, accurate and user-friendly assessment method that can be used in any technology that requires comparison of content with high accuracy and feedback such as in educational assessments of students, website content, articles, and research papers.

The system, finds more suitable application in user teacher interaction, as more individualized feedback based on user response can be provided in graphic representation, so that user can understand and comprehend the accuracy of the answer and the reasoning of the scores provided. The system aids the students to improve their understanding of the learning content.

The system for interactive feedback based assessment of user content, in accordance with the present invention can be integrated with any existing Learning Management systems and hence a simple and cost-effective feedback tool for users/students.

Embodiments herein provide a graphical representation of feedback to the users, which aids in user interactive assessment. Furthermore, the embodiments herein achieve a quantitative and qualitative assessment methodology which integrates a single multi-cloud approach in the automatic assessment of the user response.

The present system provides interactive feedback to users and provides an effective evaluation method for teachers. The present system is very easy to use and learn. The system evaluates the user response using word cloud technique for providing self-assessment and personalized feedback to the user. The present system helps the users/students to get their response evaluated without waiting for teacher's feedback. The present system helps the teachers for effective evaluation of user response/student answers. The present system does not require any new learning or training to implement. The present system presents the monotony of answers in sentences as a colorful image.

The present system employs the Superlative Model (SM) that the perfect answer and the additional words used by the user which are likely unnecessary in the response is also displayed. The comparative cloud is an efficient tool to self-reflect as feedback is personalized. Both the comparative and cohesion cloud may be shared with the students to improve their answer. For teachers instead of reading the user response line by line, the cohesion cloud may be generated and a filter may be applied to eliminate answers that scored full marks. The present system may save 30% of the valuable teaching time of teacher in evaluating the user response/answers. The system helps the Teacher to evaluate answers/responses of many students/users in a classroom and obtains instant feedback from the system as a word cloud. The system helps the Teacher to get an instant understanding of what keywords comes up on the comparative word cloud and how many students have understood the concept and what keywords are missing so that the same may be reiterated/repeated in the class rather than conducting a test and evaluate the same after a while which is time consuming and is not very effective if conducted after a time gap. The system further enables Peer to Peer evaluation to evaluate the answers/responses by comparing a first peer answer/response with the answer/response of the second user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is a table illustrating test data that is evaluated using the Superlative Model (SM) for qualitative evaluation of answers of students for different subjects according to an embodiment herein;

FIG. 7 is a table illustrating a sample set of questions provided for experimenting the Superlative Model (SM) according to an embodiment herein;

FIG. 8 is a table illustrating Superlative's algorithm result for the question of FIG. 7 according to an embodiment herein;

FIG. 9 is a table illustrating a question and an answer for English and its corresponding comparative and cohesion word cloud according to an embodiment herein;

FIG. 10 is a table illustrating a question and an answer for Biology and its corresponding comparative and cohesion word cloud according to an embodiment herein;

FIG. 11 is a table illustrating a question and an answer for Economics according to an embodiment herein;

FIG. 13 is a table illustrating a question and an answer for Geography and its corresponding comparative and cohesion word cloud according to an embodiment herein;

FIG. 14 is a table illustrating a system performance by comparing Indus Marker (IM) model and Superlative Model (SM) for qualitative evaluation of answer of students for different type of questions according to an embodiment herein;

FIG. 16 illustrates a table that includes computed values of Standard Deviation for accuracy and a time for the Indus Marker (IM) model and Superlative Model (SM) for qualitative evaluation of answer of students for different type of questions according to an embodiment herein;

FIGS. 19A-19B are flow diagrams illustrating a method for assessing a response from a user for at least one learning content and providing interactive feedback based on the assessment of user content according to an embodiment herein.

DETAILED DESCRIPTION OF PREFERRED EMBODIMENTS

Figure 1:
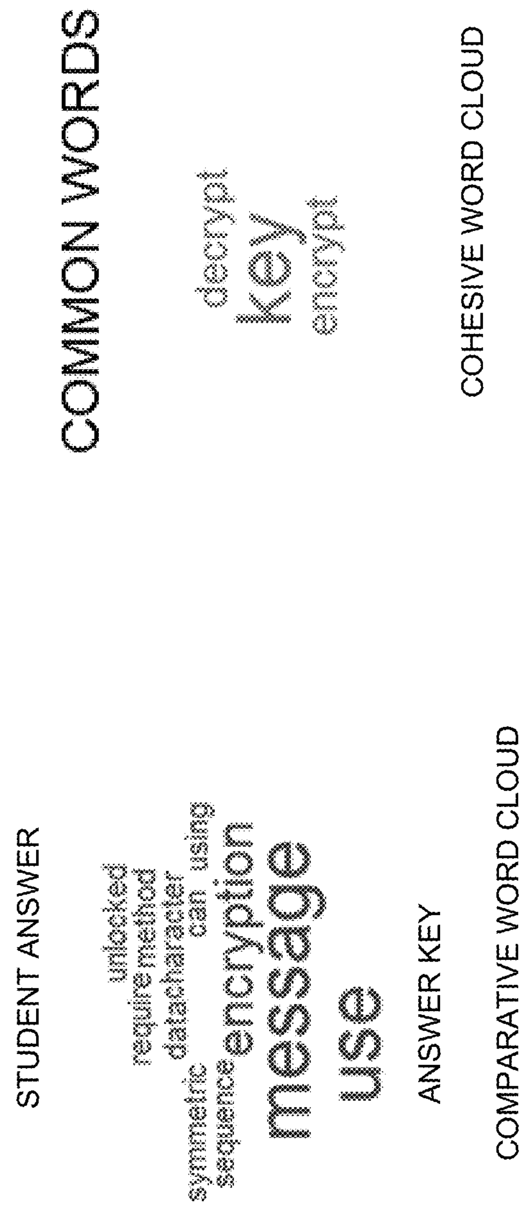
FIG. 1 illustrates a diagrammatic representation of one embodiment of a computer-implemented system in e-assessment of students answer for evaluation as comparative and cohesion word cloud for teachers according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for an interactive feedback based evaluation using multiple word cloud, more particularly, to a system and method provides graphical representation of feedback to the users, which aids in user interactive assessment and the system achieves a quantitative and qualitative assessment methodology which integrates a single multi cloud approach in automatic assessment of content. Referring now to the drawings, and more particularly to FIGS. 1 through 19B, where similar reference characters denote corresponding features consistently throughout the figures, there are shown preferred embodiments.

FIG. 1 illustrates a diagrammatic representation of one embodiment of a computer-implemented system in e-assessment of students answer for evaluation as a comparative and commonality word cloud for teachers according to an embodiment herein. The computer-implemented system assesses a response from a user for at least one learning content and providing interactive feedback based on the assessment of user content. The system comprises a processor that generates a database with at least one learning content. The database further stores at least one question associated with the at least one learning content or answer key for the at least one question. The system further provides the at least one learning content and a test comprising the at least one question to a user on a user device. The system processes a response from the user with reference to the at least one question associated with the at least one learning content module using a graphical user interface for communicating interactively with the database. The system automatically assesses the response from the user by (i) eliminating a standard list of english stop words, (ii) tokenizing keywords and corresponding synonyms from the response, (iii) performing correlation analysis for each keyword, (iv) comparing the keywords from the response with a plurality of keywords of the answer key for the at least one question, and (v) computing a score for each keyword from the response based on the comparison. The answer key for the at least one question is processed using a superlative model to create a cohesive cloud with the plurality of keywords. Each of the plurality of keywords of the answer key is assigned with a numeric weight based on its frequency. The system provides an interactive feedback to the user as a score or a graphical representation. The graphical representation is generated by creating a comparative word cloud based on the comparison of the keywords from the response from the user and the plurality of keywords from the answer key for at least one question. The comparative word cloud comprises a lower half word region and an upper half word region in different formats, and the lower half word region indicates extra keywords in the user's response to be eliminated and wherein the upper half word region indicates necessary keywords from the answer key for the at least one question for the correct answer.

In yet another embodiment, the automatic assessment comprises a quantitative and qualitative assessment of the response from the user. The size of the comparative word cloud is based on the relevance of each keyword. In yet another embodiment, the graphical representation of assessment comprises a comparability and commonality word cloud and/or a Venn diagram for the user.

In yet another embodiment, the system provides interactive feedback to the user using the graphical user interface of the user device. In yet another embodiment, the system positions keywords from the response that has high frequencies at a center of the comparative word cloud.

Figure 2:
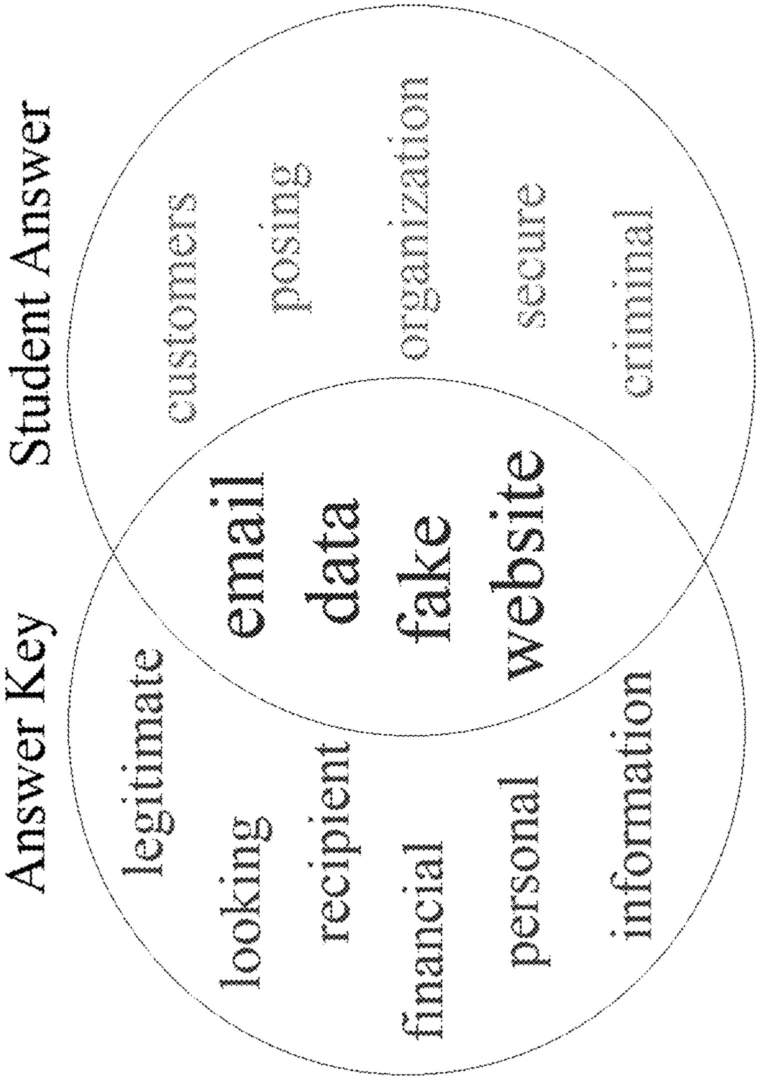
FIG. 2 is a diagrammatic representation of one embodiment of a computer-implemented system in e-assessment of students answer and provide feedback as a Venn diagram for students according to an embodiment herein.
Figure 3:
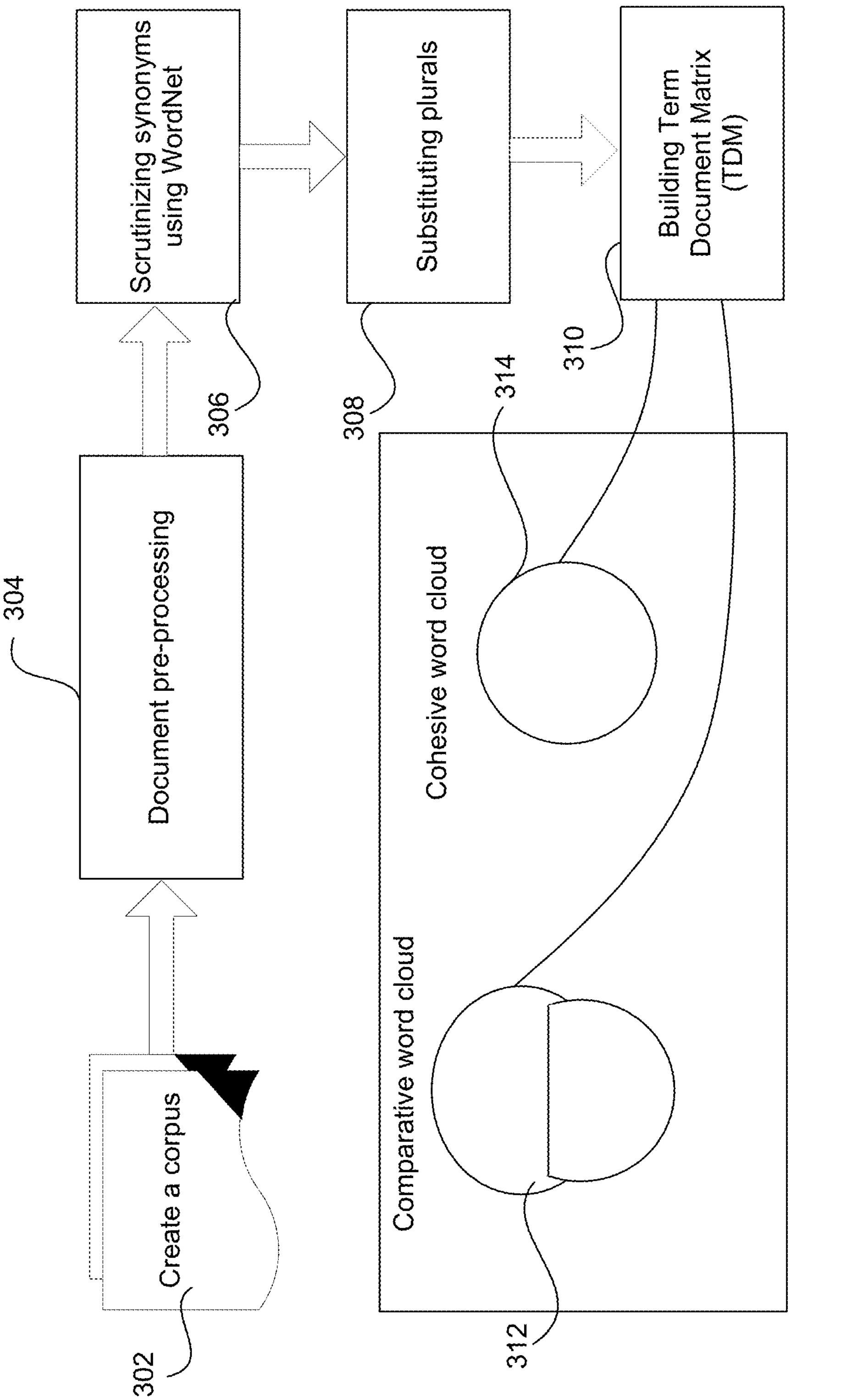
FIG. 3 illustrates a process for assessing a response from a user for at least one learning content and providing interactive feedback based on the assessment of user content according to an embodiment herein.

FIG. 2 is a diagrammatic representation of one embodiment of a computer-implemented system in e-assessment of students answer and provide feedback as a Venn diagram for students according to an embodiment herein. The computer-implemented system in e-assessment of students answer providing interactive feedback to the user as Venn diagram. The Venn diagram is generated by placing the common words in the intersection and the required word in the answer key section of the Venn diagram. Extra keywords in the student answer is also shown in the other segment of the Venn diagram. FIG. 3 illustrates a process for assessing a response from a user for at least one learning content and providing interactive feedback based on the assessment of user content using a superlative model according to an embodiment herein. At step 302, a corpus is created from a text file comprising answers key or the user response by putting the text in data frames. The Answers key and response from the user are unstructured text data that needs to be transformed into structured data for evaluation. The keywords of the answers key or the user response are deconstructed using spaces to prepare the data for text analysis using the superlative model. At step 304, a cleaning process is performed on the user response or on the answer key to remove numbers, punctuation, whitespace and unnecessary words (stop words) to all elements of the corpus. Keywords that provides only structure to the sentence like articles (a, an, the), conjunctions (and, or) are comprised as a Standard English list of stop words which may also be removed during the cleaning process. Keywords from the question may also be included in the stop word list. At step 306, synonyms are scrutinized for the keywords of the user response or the answer key. At step 308, Plural keywords from the response and the answer key are substituted into corresponding singular keywords. At step 310, after cleaning, the keywords are converted into a matrix. At step 312, a cohesion word cloud is created based on the matrix. At step 314, a cohesive and comparative word cloud is created based on the matrix. The Superlative Model (SM) presents a first-hand model to generate the cohesion and comparative cloud. The word cloud employs a crude way of text analysis in comparison to Natural Language Processing. The cohesive and comparative word cloud uses the above technique for generating pictures of words using the following steps. The steps for word cloud generation includes: (i) initially, a submitted document which is in sentences are broken into words/keywords; (ii) a numeric weight is assigned to each word according to its frequency and the formula is straight forward: weight=word count; (iii) proportional to its weight, a font size is allocated considering magnitude of various constants; (iv) a total area to be enclosed by the word cloud is estimated, centered on the factors by vaulting boxes for each word, summing and adjusting the areas for small and large words; (v) words with higher frequency/weights are placed closer to the center, all in distinct rectangular boxes; (vi) placing the words in the given space, using a randomized greedy algorithm. After the placement of words in the cloud, the word does not move; (vii) increasing spiral is the easiest of all where in a rectangle is placed at the next best position without collision.

Figure 4:
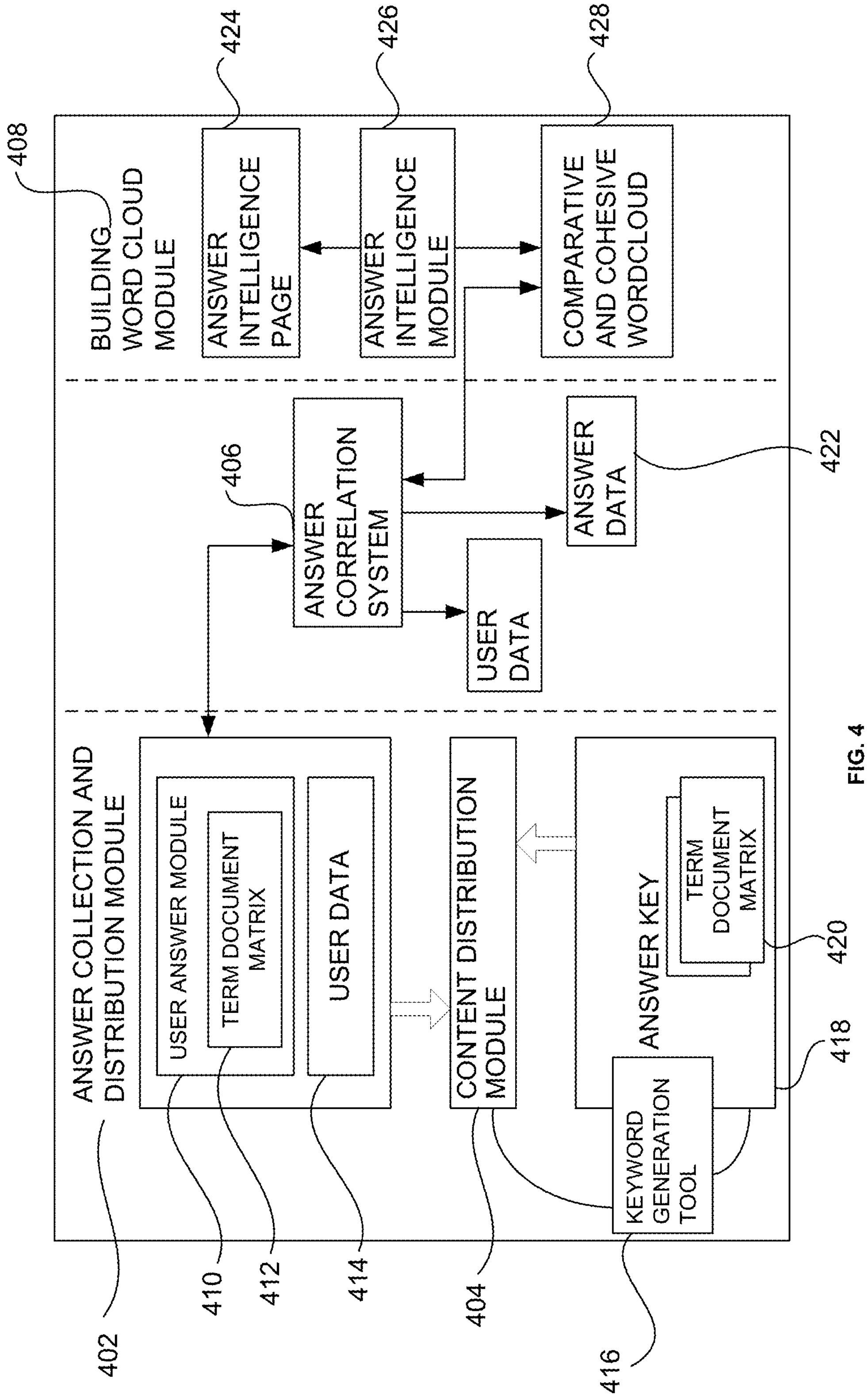
FIG. 4 is a system for assessing a response from a user for at least one learning content and providing interactive feedback based on the assessment of user content according to an embodiment herein.

FIG. 4 illustrates a system for assessing a response from a user for at least one learning content and providing interactive feedback based on an assessment of user content according to an embodiment herein. The system includes an answer collection and distribution module 402, a content distribution module 404, an answer correlation module 406 and a building word cloud module 408. The answer collection and distribution module 402 includes a user answer module 410 which includes a term-document matrix 412 and user data 414. The user answer module 410 stores the response/answers of users and the term document matrix 412 includes the matrix of term and document of user response 410. The user data 414 includes information about the students like student id, name, class, subject, phone etc.

The content distribution module 404 includes a keyword generation tool 416 and an answer key 418. The answer key 418 includes a term-document matrix 420 of the answer key. The answer key 418 includes the answers of each question and the term document matrix 420 of the answer key 418 includes the matrix of term and document of answers of each question.

The answer correlation module 406 communicates with user data 414 and answer data 422 and correlates the user response with the student data 414. The building word cloud module 408 includes an answer intelligence module 426 that is communicatively connected to an answer intelligence page 424 and a comparative and cohesive word cloud 428. The answer correlation module 406 is connected with the comparative and cohesive word cloud 428. The building word cloud module 408 creates a comparative and cohesive word cloud 428 based on the term-document matrix of the answer key and the user response.

Figure 5:
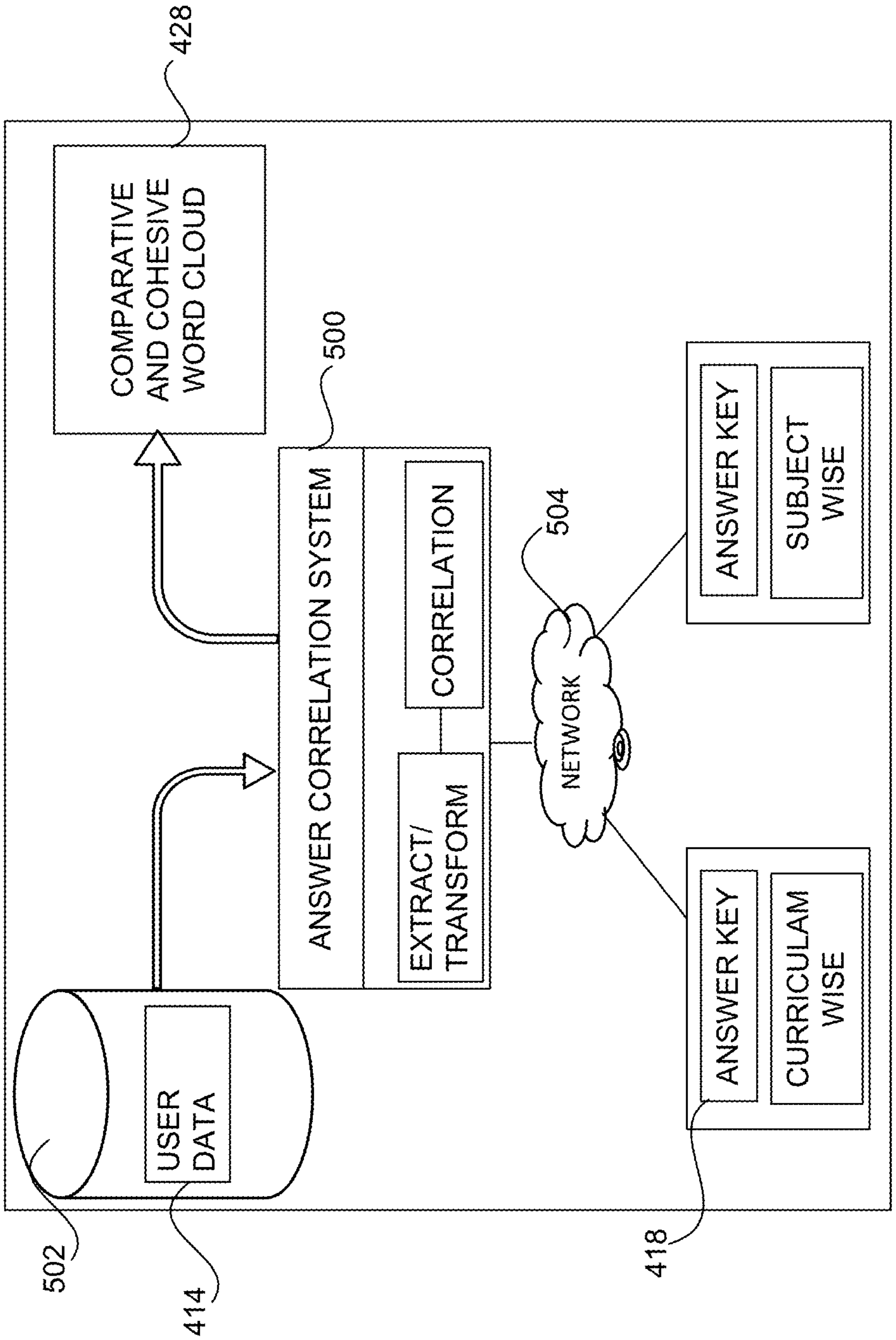
FIG. 5 is a system view of an answer correlation system for qualitative evaluation of answer of students according to an embodiment herein.

With reference to FIG. 4, FIG. 5 is a system view of an answer correlation system 500 for qualitative evaluation of responses/answers of users according to an embodiment herein. The answer correlation system 500 includes a database 502 that stores user data 414. The answer correlation system 500 is communicatively connected to an answer collection and distribution module through a network 504 to access the answer key 418. The answer correlation system 500 extracts keywords from user response and the answer key and correlates the keywords to create a comparative and cohesive word could 428 for evaluation.

FIG. 6 is a table illustrating test data that is evaluated using a Superlative Model (SM) for qualitative evaluation of answers of user/students for different subjects according to an embodiment herein. The table includes subject field 602 that includes various subjects, a student field 604 that includes a number of students for each subject, a question field 606 that includes a number of questions for each subject, an average human evaluation field 608 that includes human evaluation for each subject and a cohesion could evaluation field 610 that includes an average human evaluation using a cohesion cloud. The values of average human evaluation 608 and the values of average human evaluation using cohesion cloud 610 have very close agreement rate.

FIG. 7 is a table illustrating a sample set of questions that are provided for experimenting the Superlative Model (SM) according to an embodiment herein. The table includes a subject field 702 that includes various subjects such as Computer Science, English, Biology, Economics and History, a question number field 704 that includes a number of questions for each subject, a question field 706 that includes sample questions for each subject and a marks field 708 that includes the corresponding marks for each question of each subject.

FIG. 8 is a table illustrating Superlative's model result for the questions "What is Phishing?" according to an embodiment herein. The table includes a type field 802 that includes an answer key, a first candidate's answer and a second candidate's answer, an answer field 804 that includes the same answer as the answer key, the answer for the first candidate and the answer for the second candidate, a marks gained field 806 that includes the marks of each question for the answer key and the marks obtained by the first candidate and the second candidate and a cohesive word cloud field 808 that includes a word cloud for the answer key of the question, response/answer of the first candidate and the second candidate.

FIG. 9 is a table illustrating a question and an answer for English and its corresponding comparative and cohesion word cloud according to an embodiment herein. The table includes a question field 902 that includes a question from an un seen passage of English, an answer key 904 that includes an answer key for that question and a student answer 906 that includes response/answer from the student of that particular question. The comparative and cohesion word cloud of the answer key and the student response is generated by an assessment system for evaluating the student answer for that question.

FIG. 10 is a table illustrating a question and an answer for Biology and its corresponding comparative and cohesion word cloud according to an embodiment herein. The table includes a question field 1002, an answer key field 1004 and a student answer field 1006 for Biology subject. The question field 1002 includes a question from Biology. The answer key field 1004 includes an answer key for that question. The student answer field 1006 includes the answer/response from the student for that particular question. The comparative and cohesion word cloud of the answer key and the student answer is generated by an assessment system for evaluating the student answer for that question.

FIG. 11 is a table illustrating a question and an answer for Economics according to an embodiment herein. The table includes a question field 1102, an answer key field 1104 and a student answer field 1106 for Economics subject. The question field 1102 includes a question from Economics. The answer key field 1104 includes an answer key for that question. The student answer field 1106 includes a response/answer of the student for that particular question.

Figure 12:
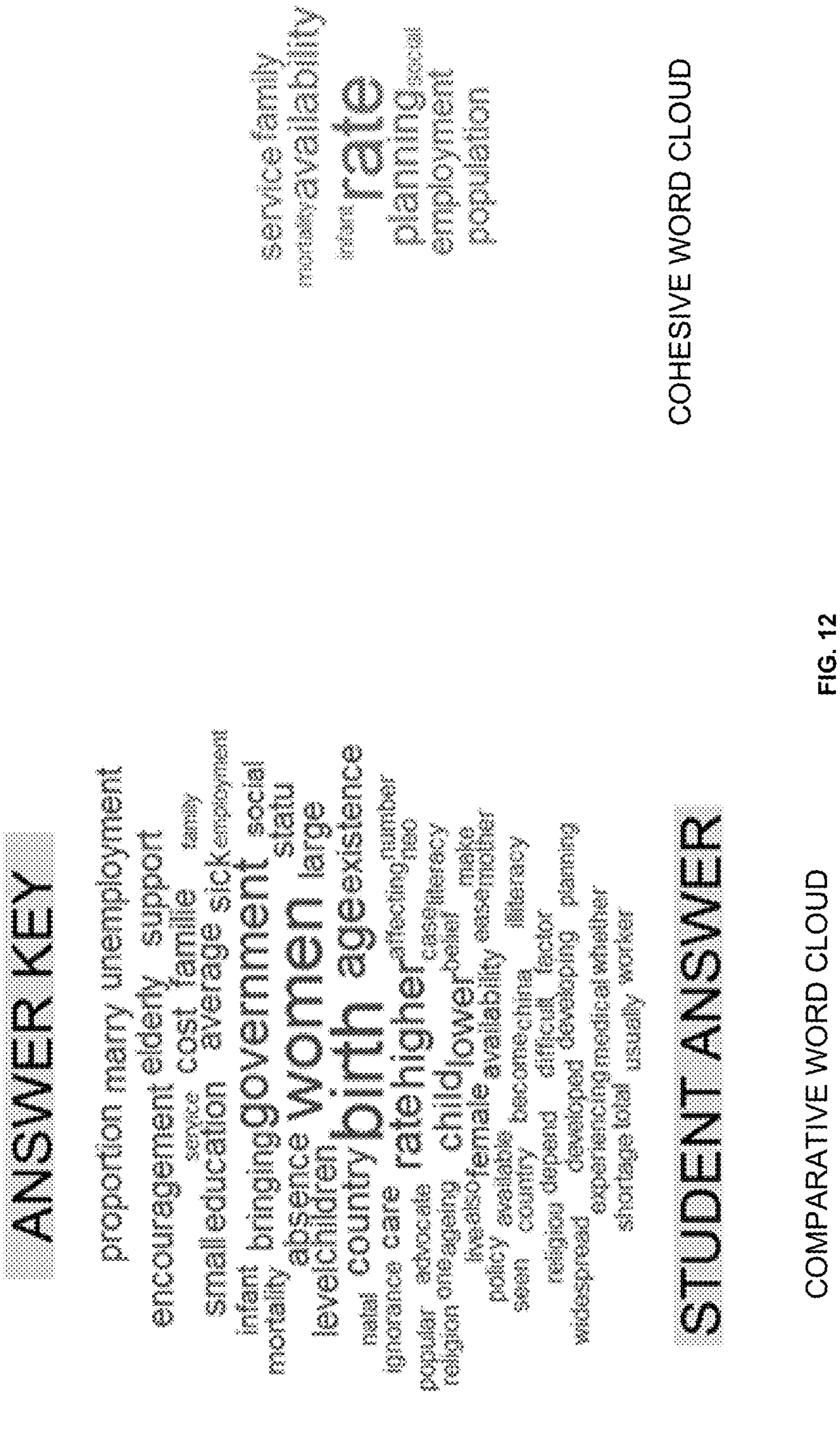
FIG. 12 is a table illustrating a comparative and cohesion word cloud of answers associated with the questions of FIG. 11 according to an embodiment herein.

FIG. 12 illustrates a comparative and cohesion word cloud of answers associated with the questions of FIG. 11 according to an embodiment herein. The comparative and cohesion word cloud of the answer key of the question of Economics and the student answer to that question of Economics is generated by an assessment system for evaluating the student answer for that question.

FIG. 13 is a table illustrating a question and an answer for Geography and its corresponding comparative and cohesion word cloud according to an embodiment herein. The table includes a question field 1302, an answer key field 1304 and a student answer field 1306. The question field 1302 includes a question from Geography. The answer key field 1304 includes answer key of that question from Geography. The student answer field 1306 includes a response/answer of the student of that particular question. The comparative and cohesion word cloud of the answer key in Geography and the student answer is generated by an assessment system for evaluating the student answer for that question.

FIG. 14 is a table illustrating a system performance by comparing an Indus Marker (IM) model and a Superlative Model (SM) for qualitative evaluation of answer of students for the different type of questions according to an embodiment herein. The table includes a serial number field 1402 that includes serial numbers for a question type, a question type field 1404 that shows a type of the question, an average answer length field (IM) 1406 that includes an average length of the answer in words for IM, an average answer length field (SM) 1408 that includes the average length of the answer in words for SM, an average human-system agreement rate field (z1) (IM) 1410 that includes an average human-system agreement rate (z1) in percentage for IM, an average human-system agreement rate field (z2) (SM) 1412 that includes the average human-system agreement rate (z2) in percentage for SM, an average time taken field (a1) (IM) 1414 that includes an average time taken (a1) for evaluating a question type in minutes for IM and an average time taken field (a2) (SM) 1416 that includes an average time taken (a2) for evaluating a question type in minutes using SM. The question type field 1404 includes sentence completion, single term generation, "Quantity" required, "Numerical value" generation, "Location" or "source" required, "Example" required, List, "Ordering/rearrangement" required, Short explanation/description, "Reason" or "justification" required, "Way of doing something" required, Definition, Compare, Contrast and Composite. The Automarking techniques and the question to evaluate the system is same in Superlative Model (SM) and the Indus Marker (IM) model. However, the SM is proved to be time efficient as the training data set is not involved which consumes time. While SM's performance is much better than IM in terms of average time and human-system agreement.

Figure 15:
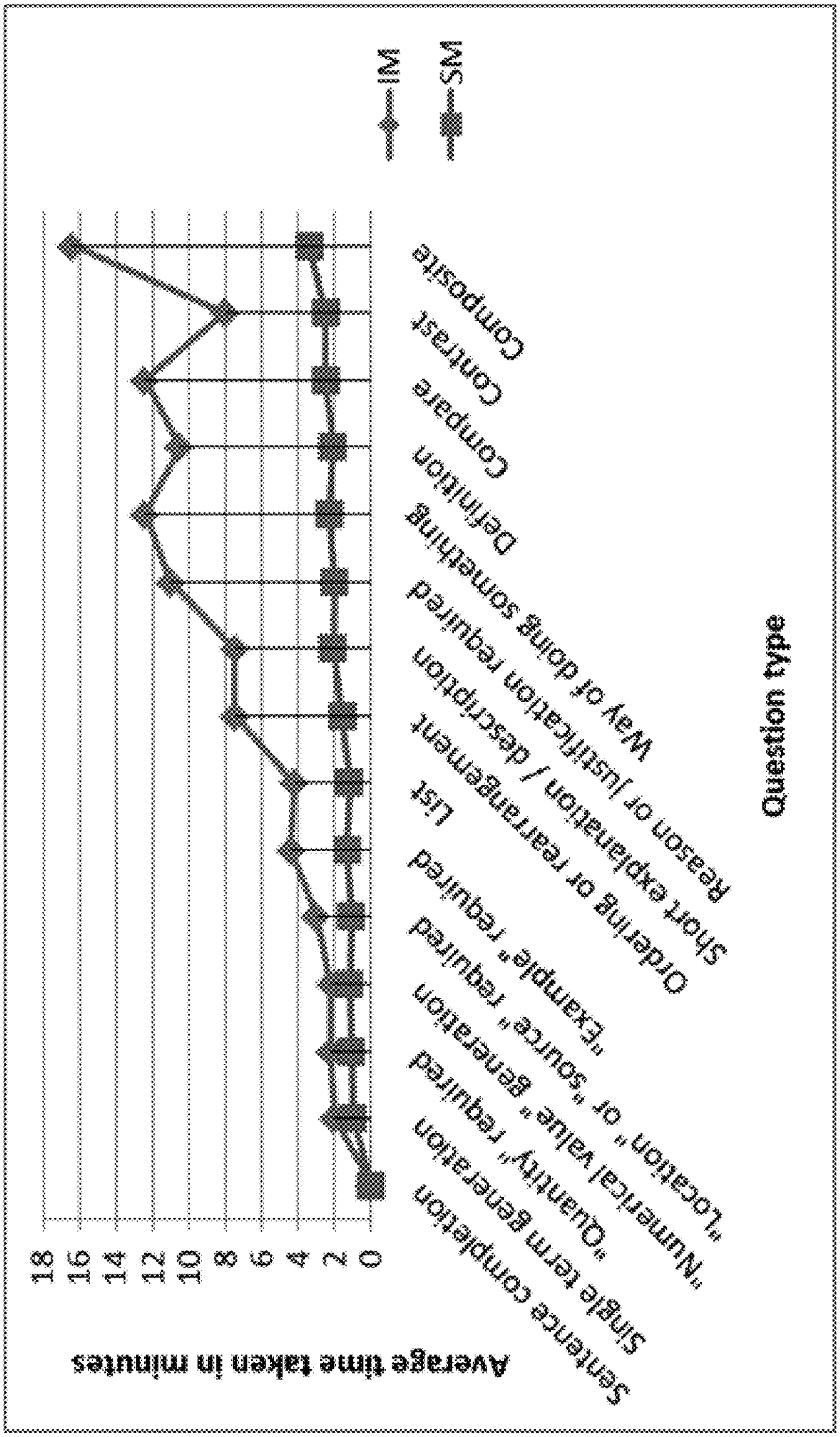
FIG. 15 is a line graph depicting a difference in average for different short-answer question types by comparing the Indus Marker (IM) model and Superlative Model (SM) for qualitative evaluation of answer of students of FIG. 14 according to an embodiment herein.

FIG. 15 is a line graph depicting a difference in average for different short-answer question types while qualitatively evaluating answer of students of FIG. 14 using the Indus Marker (IM) model and Superlative Model (SM) according to an embodiment herein. The graph depicts the difference in average time taken in minutes to qualitatively evaluate the answer of students for different short-answer question types using the Indus Marker (IM) model and Superlative Model (SM). The average time taken in minutes by the Superlative Model (SM) is lesser than the average time taken in minutes by the Indus Marker (IM) model while qualitatively evaluating the answer of students for different short-answer question types.

FIG. 16 illustrates a table that includes computed values of Standard Deviation for accuracy and a time for qualitative evaluation of answer of students for different type of questions using the Indus Marker (IM) model and Superlative Model (SM) according to an embodiment herein. The table includes a model field 1602, an accuracy field 1604 and a time field 1606. The model field 1602 includes the Indus Marker (IM) model and the Superlative Model (SM). The accuracy field 1604 includes an accuracy in evaluation using the Indus Marker (IM) model and the Superlative Model (SM). The accuracy field 1604 scores deviation from the mean is only 2.82 in SM compared to 4.7 in IM which is almost 50% decrease in deviations. The time field 1606 includes a time taken to compute any type of question to be evaluated using the Indus Marker (IM) model and the Superlative Model (SM). SM takes 4 epochs less time to evaluate any type of question. Therefore, SM has proved its enhancement in terms of both accuracy and time efficiency. SM's human agreement rate and time efficiency also are high when compare to IM.

Typically, in the Indus Marker (IM) model, evaluation is provided to students regardless of the size of the class in the form of marks/grades and no feedback is provided, whereas in the Superlative Model (SM), feedback is provided in a visually appealing method through a comparative cloud instantaneously. In the Indus Marker (IM) model, the same practice test may be repeated whenever the same course is taken, whereas in Superlative Model (SM), same questions need not be repeated and the questions may be of any type of question and only answer key is required for comparison. Further, in the Indus Marker (IM) model, if the student's collective performance is bad, the teacher may decide to slow down the pace of the course material delivery, whereas in the Superlative Model (SM), whole classes answers may be compared and identify exactly where the students have not understood the topic and same can be considered again. In Indus Marker (IM) model, high human-system agreement rates are achieved for all short-answer question types, whereas in the Superlative Model (SM), human agreement rate is nearly 100% as humans evaluate it at the end based on keywords only. In the Indus Marker (IM) model, a new purpose-designed language called QAML is defined, whereas in the Superlative Model (SM), qualitative and qualitative analysis of text is performed to create a word cloud. In the Indus Marker (IM) model, development of descriptions of correct "answer structures" is performed, whereas in the Superlative Model (SM), a complete answer key with all possible answers in sentence or keyword form is sufficient. Indus Marker's performance and usage at other levels of education and in other subject areas are evaluated. The Superlative Model (SM) may be included into other LMS. SM is more accurate when it comes to human system agreement and time efficiency when compared to IM model. SM has attained simplicity in use and also provides a visual appeal with a lot of advantages over the Indus Marker model.

Figure 17:
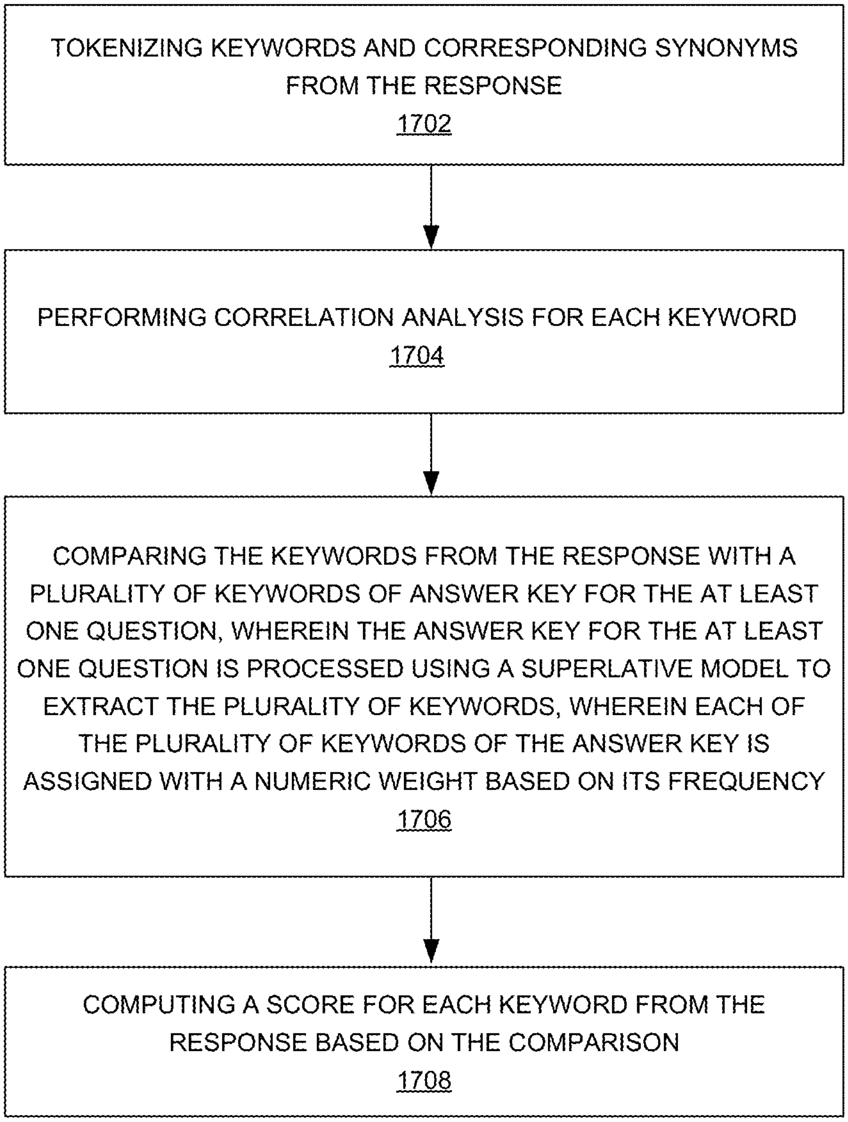
FIG. 17 is a flow diagram illustrating a method for computing marks for a response from a user to at least one question according to an embodiment herein.

FIG. 17 is a flow diagram illustrating a method for computing score for a response from a user to at least one question according to an embodiment herein. At step 1702, keywords and corresponding synonyms from the response are tokenized. At step 1704, correlation analysis is performed for each keyword. At step 1706, the keywords from the response are compared with a plurality of keywords of answer key for the at least one question. The answer key for the at least one question is processed using a superlative model to extract the plurality of keywords. Each of the plurality of keywords of the answer key is assigned with a numeric weight based on its frequency. At step 1708, a score is computed for each keyword from the response based on the comparison.

Figure 18:
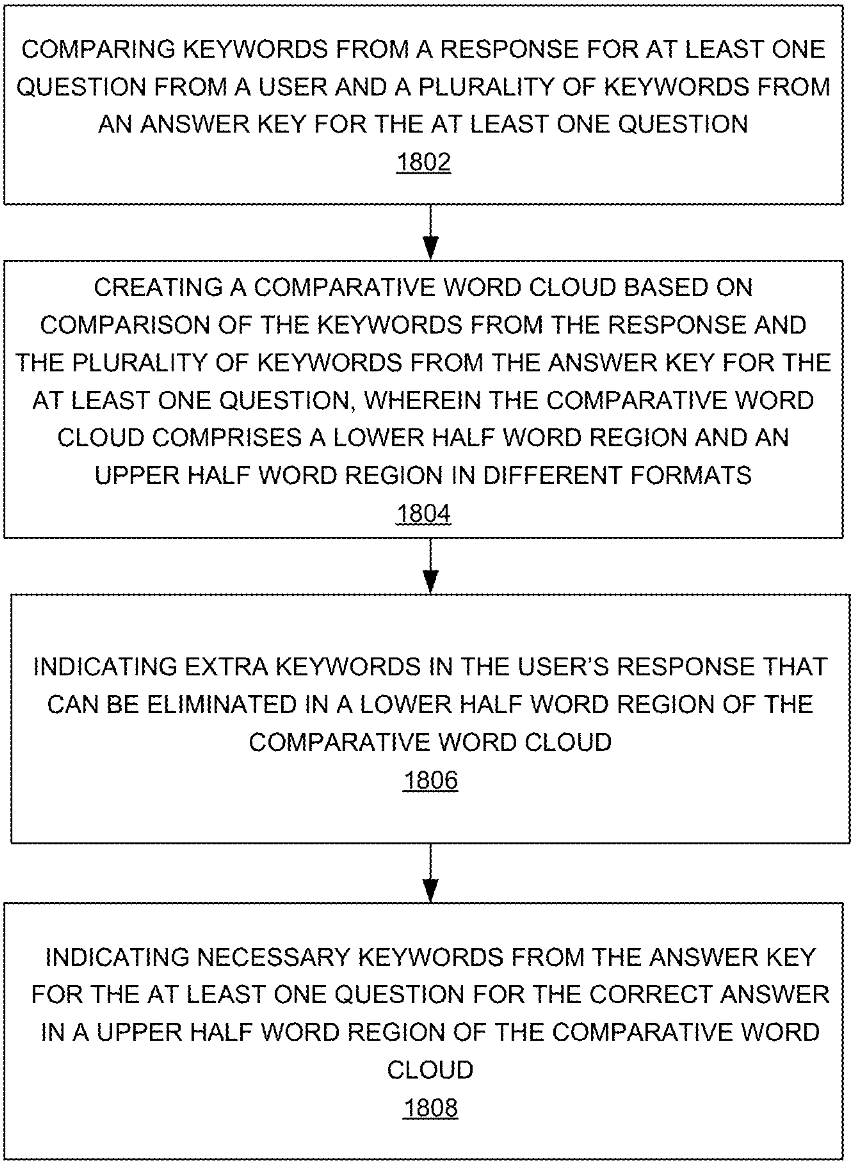
FIG. 18 is a flow diagram illustrating a method for providing interactive feedback to a user according to an embodiment herein.

FIG. 18 is a flow diagram illustrating a method for providing interactive feedback to a user according to an embodiment herein. At step 1802, keywords from a response for at least one question from a user is compared with a plurality of keywords from an answer key for the at least one question. At step 1804, a comparative word cloud is created based on the comparison of the keywords from the response from the user and the plurality of keywords from the answer key for at least one question. The comparative word cloud comprises a lower half word region and an upper half word region in different formats. At step 1806, the lower half word region indicates extra keywords in the user's response to be eliminated. At step 1808, the upper half word region indicates necessary keywords from the answer key for the at least one question for the correct answer.

Figure 19A:
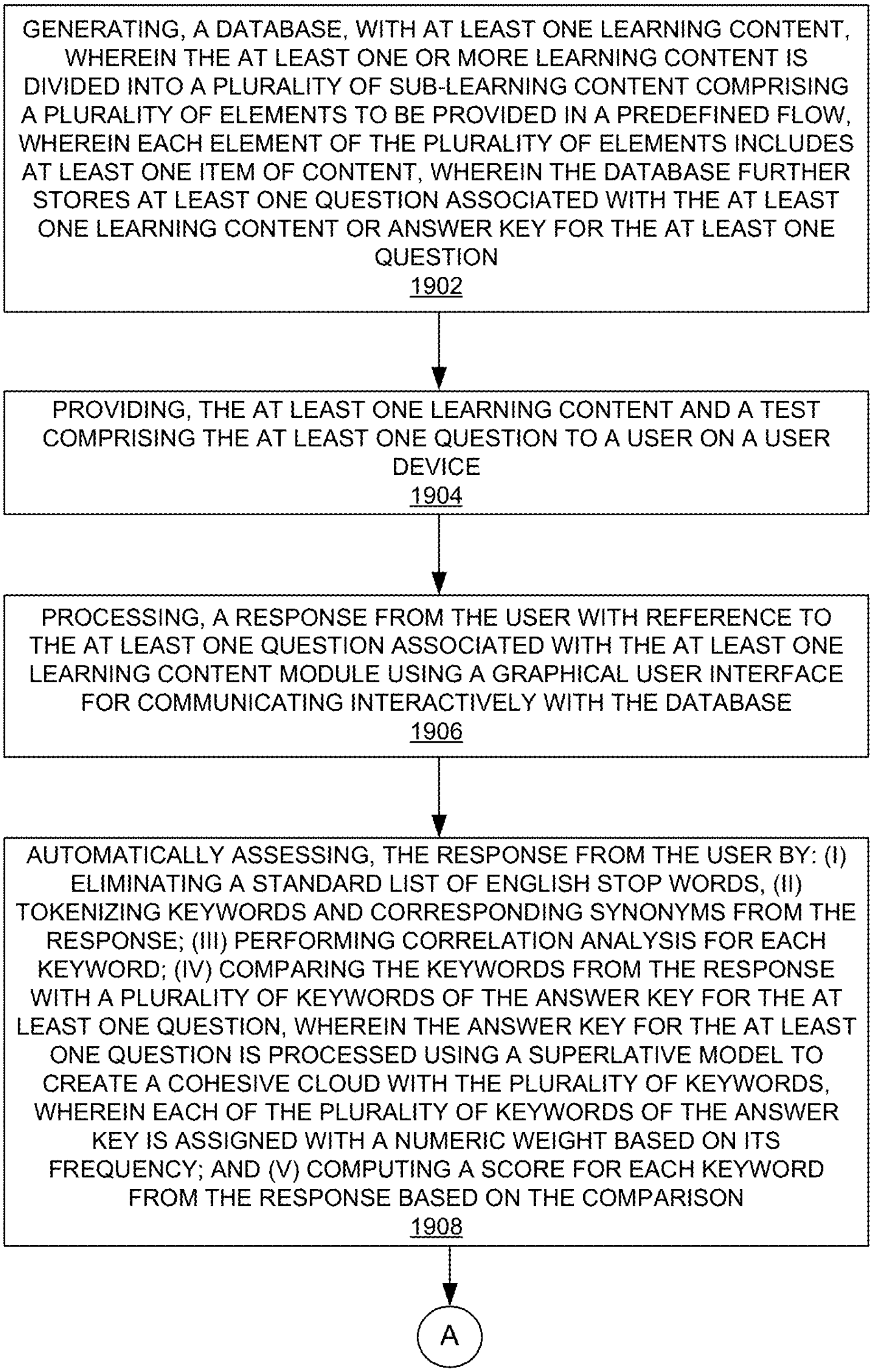

FIGS. 19A-19B are flow diagrams illustrating a method for assessing a response from a user for at least one learning content and providing interactive feedback based on the assessment of user content according to an embodiment herein. At step 1902, a database is generated with at least one learning content. The at least one learning content is divided into a plurality of sub-learning content comprising a plurality of elements to be provided in a predefined flow. Each element of the plurality of elements includes at least one item of content. The database further stores at least one question associated with the at least one learning content or answer key for the at least one question. At step 1904, the at least one learning content is provided and a test comprising the at least one question to a user on a user device. At step 1906, a response from the user is processed with reference to the at least one question associated with the at least one learning content module using a graphical user interface for communicating interactively with the database. At step 1908, the response from the user is automatically assessed by (i) eliminating a standard list of english stop words, (ii) tokenizing keywords and corresponding synonyms from the response, (iii) performing correlation analysis for each keyword, (iv) comparing the keywords from the response with a plurality of keywords of the answer key for the at least one question, and (v) computing a score for each keyword from the response based on the comparison. The answer key for the at least one question is processed using a superlative model to create a cohesive cloud with the plurality of keywords and each of the plurality of keywords of the answer key is assigned with a numeric weight based on its frequency. At step 1910, an interactive feedback is provided to the user as a score or graphical representation. The graphical representation is generated by creating a comparative word cloud based on the comparison of the keywords from the response from the user and the plurality of keywords from the answer key for at least one question. The comparative word cloud comprises a lower half word region and an upper half word region in different formats. The lower half word region indicates extra keywords in the user's response to be eliminated and the upper half word region indicates necessary keywords from the answer key for the at least one question for the correct answer.

In one embodiment, the method employs SM that engages in partial evaluation of the user response where the word cloud is built using keywords. The user response may be split into one word/closed keyword based answers to be evaluated automatically. The rest of the user response may be built as separate cohesive clouds, where the keywords are compared and displayed for easy evaluation. The present method provides an option for drag and drop for the users response, the comparative and cohesive word cloud is generated for the user response and appears as an image. The cohesion and comparative word cloud may work as a good visual analytics and evaluation tool in e-learning. The method may provide instantaneous feedback highlighting the keywords which are unnecessary versus the keywords that are required in the answer along with the marks obtained. The method requires users/students to submit user response digitally. With classroom getting smart boards, tabs, projectors etc. the user may type in the answers. In real time, the keywords from the user response may be compared with the answer key and the words get displayed on a whiteboard. The method enables the teacher to revisit the concepts which were not present in the word cloud rather focus on the keywords in the comparative cloud. This is the right approach for teaching by getting to know what concepts are clear versus what needs to be revisited rather than getting to know after a week or a month in some scenarios. The method enables further helps to improve group learning. The method may also be used to user response from the two different users. The method may compare and visualize both the user response to enable Peer to Peer learning.

The Superlative Model (SM) has been tested in K12 space but the same may be extended to higher education, adult learning, corporate trainings and self learning, particularly where a short/descriptive/essay type of questioning and answering is involved. The SM is tested for questions and answers in English and the same may be extended for regional languages by developing a database of questions and answers in respective languages.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for assessing a response from a user for at least one learning content and providing an interactive feedback based on assessment of user content, said system comprising:

a memory that stores a set of instructions; and a processor that executes the set of instructions and is configured to generate a database with at least one learning content, wherein the at least one or more learning content is divided into a plurality of sub-learning content comprising a plurality of elements to be provided in a predefined flow, wherein each element of the plurality of elements includes at least one item of content, wherein said database further stores at least one question associated with the at least one learning content or answer key for the at least one question;

provide the at least one learning content and a test comprising the at least one question to a user on a user device;

process a response from the user with reference to the at least one question associated with the at least one learning content module using a graphical user interface for communicating interactively with the database;

automatically assess the response from the user by eliminating a standard list of English stop words;

tokenizing keywords and corresponding synonyms from the response;

performing correlation analysis for each keyword;

comparing the keywords from the response with a plurality of keywords of the answer key for the at least one question, wherein the answer key for the at least one question is processed using a superlative model to create a cohesive cloud with the plurality of keywords, wherein each of the plurality of keywords of the answer key is assigned with a numeric weight based on its frequency; and computing a score for each keyword from the response based on the comparison; and provide an interactive feedback to the user as score or graphical representation, wherein said graphical representation is generated by creating a comparative word cloud based on the comparison of the keywords from the response from the user and the plurality of keywords from the answer key for at least one question, wherein said comparative word cloud comprises a lower half word region and an upper half word region in different formats, wherein the lower half word region indicates extra keywords in the user's response to be eliminated and wherein the upper half word region indicates necessary keywords from the answer key for the at least one question for the correct answer.

2. The system of claim 1, wherein the at least one learning content comprises at least one of a text, a visual or a video arithmetic.

3. The system of claim 1, wherein the automatic assessment comprises a quantitative and qualitative assessment of the response from the user, wherein a size of the comparative word cloud is based on the relevance of each keyword.

4. The system of claim 1, wherein the graphical representation of assessment comprises a comparability and commonality word cloud and/or a Venn diagram for the user.

5. The system of claim 1, wherein the processor provides the score obtained and the interactive feedback to the user using the graphical user interface of the user device.

6. The system of claim 1, wherein the processor positions the keywords from the response that has high frequencies at a center of the comparative word cloud.

7. A computer-implemented method for assessing a response from a user for at least one learning content and providing interactive feedback based on assessment of user content, said method comprising:

generating a database, with at least one learning content, wherein the at least one or more learning content is divided into a plurality of sub-learning content comprising a plurality of elements to be provided in a predefined flow, wherein each element of the plurality of elements includes at least one item of content, wherein said database further stores at least one question associated with the at least one learning content or answer key for the at least one question;

providing, the at least one learning content and a test comprising the at least one question to a user on a user device;

processing a response from the user with reference to the at least one question associated with the at least one learning content module using a graphical user interface for communicating interactively with the database;

automatically assessing, the response from the user by eliminating a standard list of English stop words;

tokenizing keywords and corresponding synonyms from the response;

performing correlation analysis for each keyword;

comparing the keywords from the response with a plurality of keywords of the answer key for the at least one question, wherein the answer key for the at least one question is processed using a superlative model to create a cohesive cloud with the plurality of keywords, wherein each of the plurality of keywords of the answer key is assigned with a numeric weight based on its frequency; and computing a score for each keyword from the response based on the comparison; and providing an interactive feedback to the user as score or graphical representation, wherein said graphical representation is generated by creating a comparative word cloud based on the comparison of the keywords from the response from the user and the plurality of keywords from the answer key for at least one question, wherein said comparative word cloud comprises a lower half word region and an upper half word region in different formats, wherein the lower half word region indicates extra keywords in the user's response to be eliminated and wherein the upper half word region indicates necessary keywords from the answer key for the at least one question for the correct answer.

8. The method of claim 7, wherein the automatic assessment comprises a quantitative and qualitative assessment of the response from the user, wherein a size of the comparative word cloud is based on the relevance of each keyword.

9. The method of claim 7, wherein the graphical representation of assessment comprises a comparability and commonality word cloud and/or a Venn diagram for the user.

10. The method of claim 7, wherein the interactive feedback is provided to the user using the graphical user interface of the user device.

11. The method of claim 7, wherein the keywords from the response that has high frequencies is positioned at a center of the comparative word cloud.

12. A non-transitory computer-readable storage medium storing a sequence of instructions, which when executed by a processor, causes assessment of a response from a user for at least one learning content and providing interactive feedback based on assessment of user content, said sequence of instructions comprising:

generating a database with at least one learning content, wherein the at least learning content is divided into a plurality of sub-learning content comprising a plurality of elements to be provided in a predefined flow, wherein each of the plurality of elements comprises at least one item of content, wherein said database further stores at least one question associated with the at least one learning content or answer key for the at least one question;

providing the at least one learning content and a test comprising the at least one question to a user on a user device;

processing a response from the user with reference to the at least one question associated with the at least one learning content module using a graphical user interface for communicating interactively with the database;

automatically assessing the response from the user by eliminating a standard list of English stop words;

tokenizing keywords and corresponding synonyms from the response;

performing correlation analysis for each keyword;

comparing the keywords from the response with a plurality of keywords of the answer key for the at least one question, wherein the answer key for the at least one question is processed using a superlative model to create a cohesive cloud with the plurality of keywords, wherein each of the plurality of keywords of the answer key is assigned with a numeric weight based on its frequency; and computing a score for each keyword from the response based on the comparison; and providing an interactive feedback to the user as score or a graphical representation, wherein said graphical representation is generated by creating a comparative word cloud based on the comparison of the keywords from the response from the user and the plurality of keywords from the answer key for at least one question, wherein said comparative word cloud comprises a lower half word region and an upper half word region in different formats, wherein the lower half word region indicates extra keywords in the user's response to be eliminated and wherein the upper half word region indicates necessary keywords from the answer key for the at least one question for the correct answer.

13. The non-transitory computer-readable storage medium storing the sequence of instructions of claim 12, wherein the automatic assessment comprises a quantitative and qualitative assessment of the response from the user, wherein a size of the comparative word cloud is based on the relevance of each keyword.

14. The non-transitory computer-readable storage medium storing the sequence of instructions of claim 12, wherein the graphical representation of assessment comprises a comparability and commonality word cloud and/or a Venn diagram for the user.

15. The non-transitory computer-readable storage medium storing the sequence of instructions of claim 12, wherein the interactive feedback is provided to the user using the graphical user interface of the user device.

* * * * *